(12) United States Patent
Uto et al.

(10) Patent No.: US 8,186,131 B2
(45) Date of Patent: May 29, 2012

(54) DOOR PANEL

(75) Inventors: Ryoji Uto, Tokyo (JP); Shigemi Takeuchi, Hyogo (JP)

(73) Assignee: Caterpillar Japan, Ltd., Tokyo (JP)

( * ) Notice: Subject to any disclaimer, the term of this patent is extended or adjusted under 35 U.S.C. 154(b) by 0 days.

(21) Appl. No.: 12/988,915

(22) PCT Filed: May 27, 2009

(86) PCT No.: PCT/JP2009/059686
§ 371 (c)(1),
(2), (4) Date: Oct. 21, 2010

(87) PCT Pub. No.: WO2010/018705
PCT Pub. Date: Feb. 18, 2010

(65) Prior Publication Data
US 2011/0036047 A1 Feb. 17, 2011

(30) Foreign Application Priority Data
Aug. 13, 2008 (JP) .................. 2008-208621

(51) Int. Cl.
*E06B 3/70* (2006.01)
*B62D 25/10* (2006.01)

(52) U.S. Cl. .................. 52/784.1; 52/784.13; 52/784.15; 52/794.1; 296/146.5; 296/146.6; 247/129.5; 114/117

(58) Field of Classification Search .................. 52/309.9, 52/782.1, 783.1, 783.11, 783.12, 783.14, 52/784.1, 784.12, 784.13, 784.15, 791.1, 52/792.1, 794.1, 799.1; 296/146.5, 146.6, 187.1; 49/501, 502; 454/184; 244/129.5; 114/117

See application file for complete search history.

(56) References Cited

U.S. PATENT DOCUMENTS

| | | | | |
|---|---|---|---|---|
| 4,411,466 | A * | 10/1983 | Koike | 296/146.6 |
| 5,743,588 | A * | 4/1998 | Ufrecht | 296/146.6 |
| 5,941,624 | A * | 8/1999 | Pfeffer et al. | 312/405.1 |
| 6,052,887 | A * | 4/2000 | Dziadosz et al. | 29/509 |
| 6,164,716 | A * | 12/2000 | Palazzolo et al. | 296/187.12 |
| 6,929,308 | B2 * | 8/2005 | Komatsu et al. | 296/146.5 |
| 7,537,267 | B2 * | 5/2009 | Tanaka et al. | 296/146.6 |
| 2006/0090418 | A1 * | 5/2006 | Wieschermann et al. | 52/784.1 |

FOREIGN PATENT DOCUMENTS

| | | |
|---|---|---|
| JP | 54-160300 U | 6/1981 |
| JP | 56-76822 U | 6/1981 |
| JP | 9-228412 A | 9/1997 |
| JP | 2005-145224 A | 6/2005 |
| JP | 2005-239092 A | 9/2005 |
| JP | 2006-44311 A | 2/2006 |

* cited by examiner

*Primary Examiner* — Brian Glessner
*Assistant Examiner* — James Buckle, Jr.
(74) *Attorney, Agent, or Firm* — McDermott Will & Emery LLP

(57) ABSTRACT

The present invention provides a door panel that comprises an outer panel and an inner panel joined together at adhering portions and, regardless of whether rib portions are formed on the adhering portions in order to prevent deformation of the adhering portions or for other purpose, can be modified to withstand severe heat by means of formation of large ventilation openings in the adhering portions without significantly impairing the shape or the strength of the door panel.

4 Claims, 16 Drawing Sheets

ID DOOR PANEL

CROSS REFERENCE TO PRIOR APPLICATIONS

This application is a U.S. National Phase application under 35 U.S.C. §371 of International Application No. PCT/JP2009/059686, filed on May 27, 2009 and claims benefit of priority to Japanese Patent Application No. 2008-208621, filed on Aug. 13, 2008. The International Application was published in Japanese on Feb. 18, 2010 as WO 2010/018705 A1 under PCT Article 21(2). All of these applications are herein incorporated by reference.

TECHNICAL FIELD

The present invention relates to a door panel with a double-panel structure comprising an outer panel and an inner panel.

BACKGROUND OF THE INVENTION

FIG. 14 illustrates a hydraulic excavator 10 including a lower structure 11, an upper structure 12, a cab 13, a work equipment 14, and a power system 15 that includes an engine. The cab 13, the work equipment 14, and the power system 15 are mounted on the upper structure 12, which is rotatably mounted on the lower structure 11. The power system 15 is covered by a top cover 16, side doors 17, and other such components.

Examples of a side door 17 of this type include a double-panel structure comprising an outer panel and an inner panel with an irregular shape formed of raised and recessed portions, wherein the inner panel has a plurality of recessed portions, and the outer panel and the inner panel are affixed to each other by bonding the recessed portions of the inner panel to the outer panel and hemming the peripheral edge of the outer panel (e.g. See Japanese Laid-open Patent Publication No. 9-228412 (pp 2-3, and FIGS. 2-8)).

An example of structures of a door panel developed from such a door panel with a double-panel structure has been proposed. As illustrated in FIG. 15, the derived version of the door panel comprises an outer panel 21 and an inner panel 23 affixed to the inner surface of the outer panel 21. The inner panel 23 has ventilation openings 25, flat adhering portions 27 bonded to the outer panel 21, and a raised portion 29. The ventilation openings 25 are formed by cutting away portions of the inner panel 23. The adhering portions 27 are formed by recessing portions of the inner panel 23. The raised portion 29 is formed so as to bulge away from the outer panel 21. Vertically extending rib portions 31 are formed on the adhering portions 27.

With a conventional door panel with a double-panel structure, the adhering portions 27 of the inner panel 23 are prone to deformation when the outer panel 21 and the adhering portions 27 are bonded together by means of an adhesive. However, the vertically extending rib portions 31 of the developed version of the door panel described above prevent such deformation of the adhering portions 27 and also contribute to increasing the rigidity of the panels, as well as serve as adhesive retaining portions for recovering a surplus of the adhesive. In cases where the door panel were to be modified to withstand severe heat, however, the rib portions 31 interfere with allowing such a modification.

To be more specific, as illustrated in FIG. 16, cutting the portions of the adhering portions 27 where the rib portions 31 are provided results in the formation of holes or the like at the cut surfaces of the adhering portions 27.

In order to solve the above problems, an object of the invention is to provide a door panel that comprises an outer panel and an inner panel joined together at adhering portions and enables formation of large ventilation openings in the adhering portions without significantly impairing the shape or the strength of the door panel, regardless of whether rib portions are formed on the adhering portions in order to prevent deformation of the adhering portions or for other purpose.

SUMMARY OF THE INVENTION

The present invention relates to a door panel including an outer panel and an inner panel affixed to the inner surface of the outer panel. The inner panel includes a frame-like reinforcing raised portion, a plurality of laterally extending crossbar-shaped reinforcing raised portions, flat adhering portions, and vertically extending rib portions, and opening cutout portions. The frame-like reinforcing raised portion is formed by bulging the peripheral portion of the inner panel in a direction away from the outer panel. The crossbar-shaped reinforcing raised portions are provided within a boundary defined by the frame-like reinforcing raised portion and formed as an integral body with the frame-like reinforcing raised portion. The adhering portions are surrounded by the frame-like reinforcing raised portion and the crossbar-shaped reinforcing raised portions and joined to the outer panel. The rib portions are provided within the adhering portions. Each opening cutout portion is a portion to be cut out to form a ventilation opening in each respective adhering portion and includes portions that extend uninterruptedly at locations respectively adjacent to the upper and lower ends of the rib portions of the adhering portion.

According to the present invention, the frame-like reinforcing raised portion of the inner panel of the door panel of the present invention has a cross section larger than that of each crossbar-shaped reinforcing raised portion.

According to the present invention, the door panel according to the present invention includes a hemmed portion formed by folding the peripheral edge of the outer panel so as to curl over the peripheral edge of the inner panel and then pressing down the folded part, and the frame-like reinforcing raised portion of the inner panel is formed so as to rise from the hemmed portion of the outer panel.

Accordingly, the vertically extending rib portions are formed within the flat adhering portions, which are surrounded by the frame-like reinforcing raised portion and the crossbar-shaped reinforcing raised portions of the inner panel and joined to the outer panel. Each adhering portion includes an opening cutout portion, which can be cut out for formation of a ventilation opening and includes portions that extend uninterruptedly at locations respectively adjacent to the upper and lower ends of the rib portions of the adhering portion. The rib portions prevent deformation and improve the rigidity of the adhering portions. Furthermore, it is possible to form a large ventilation opening in each adhering portion without significantly impairing the shape or the strength of the door panel by cutting out the ventilation opening from the adhering portion, together with the rib portions, along the periphery of the opening cutout portion, which extends uninterruptedly without intersecting the rib portions. The door panel according to the invention can thus be easily modified to withstand severe heat. Furthermore, a clean-cut surface is ensured, because the door panel according to the invention is free from the problem of holes or the like forming the cut surfaces of the adhering portions.

Further, the frame-like reinforcing raised portion, which has a relatively large cross section, is excellent in cross-sectional characteristics, such as the geometric moment of inertia, and not easily deformed by bending stress or other similar external force. Therefore, even if the ventilation openings are cut out of the door panel, the frame-like reinforcing raised portion ensures sufficient strength, while the crossbar-shaped reinforcing raised portions, which have a relatively small cross section, ensure the ventilation openings are formed with a great aperture area.

Accordingly, the frame-like reinforcing raised portion of the inner panel is formed so as to rise from the hemmed portion of the outer panel, which is formed by folding the peripheral edge of the outer panel. Therefore, the rigidity of the door panel is increased by the hemmed portion and the frame-like reinforcing raised portion adjacent thereto. Furthermore, as the distance from the frame-like reinforcing raised portion to the peripheral edge of the panel is reduced, the ventilation openings are ensured of having a correspondingly great aperture area.

DETAILED DESCRIPTION OF THE INVENTION

Figure 7:
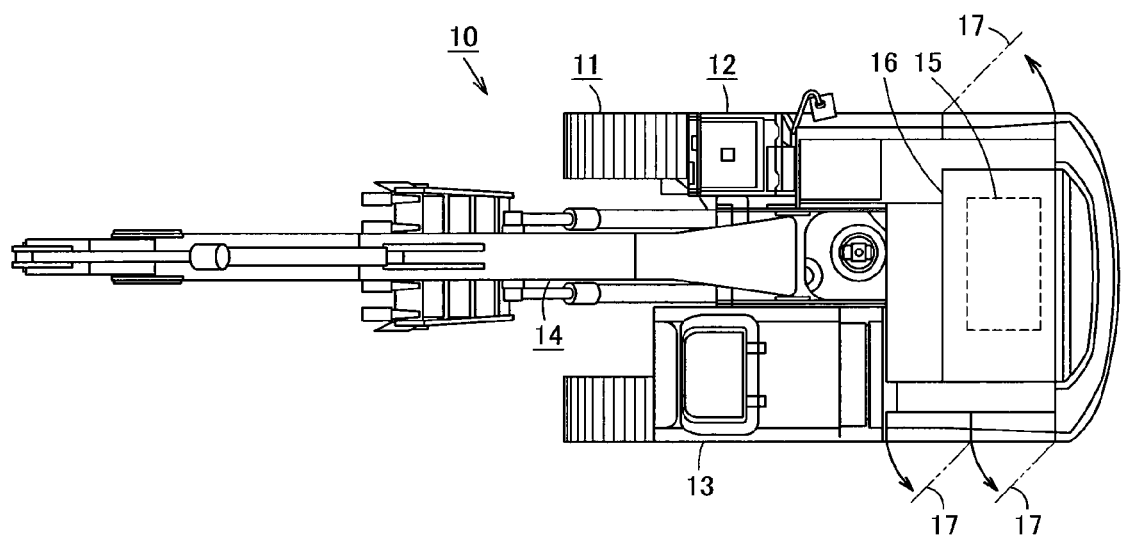
FIG. 7 is a plan view of a work machine provided with the door panel.
Figure 8:
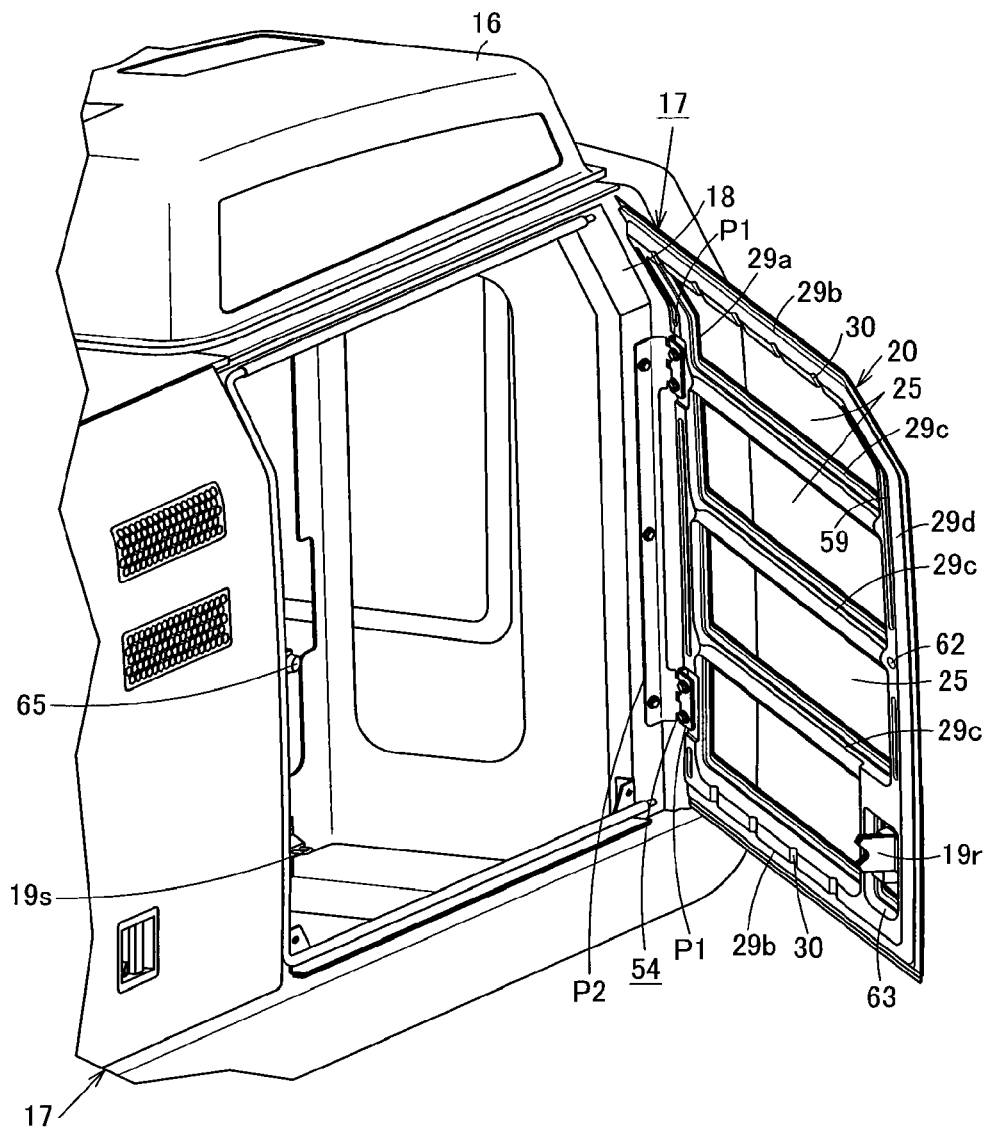
FIG. 8 is a perspective view of the work machine, illustrating the state in which the door panel is attached to the work machine.
Figure 9:
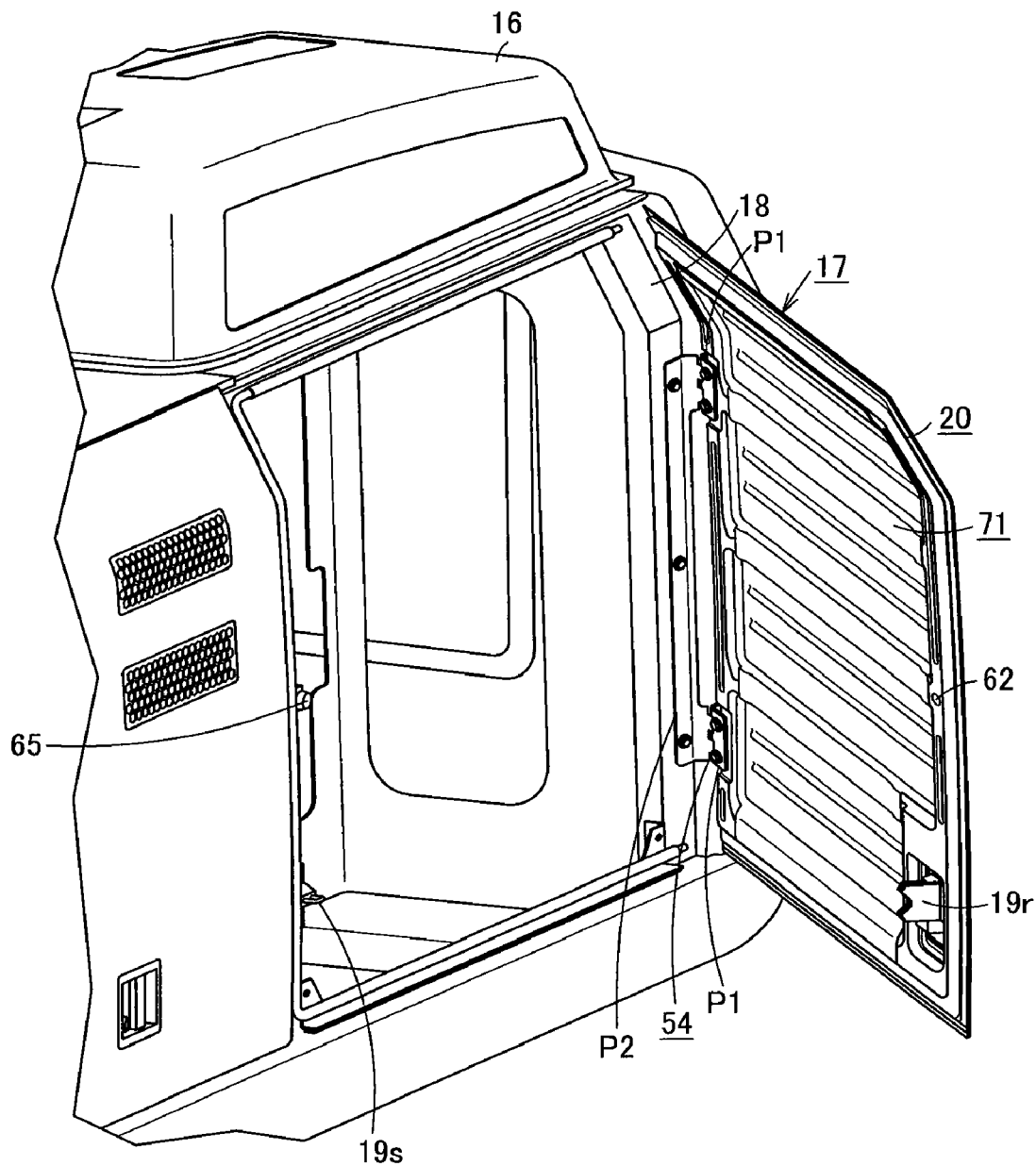
FIG. 9 is a perspective view of a door panel according to another example of the present invention, wherein a dust prevention screen is attached to the door panel.
Figure 10:
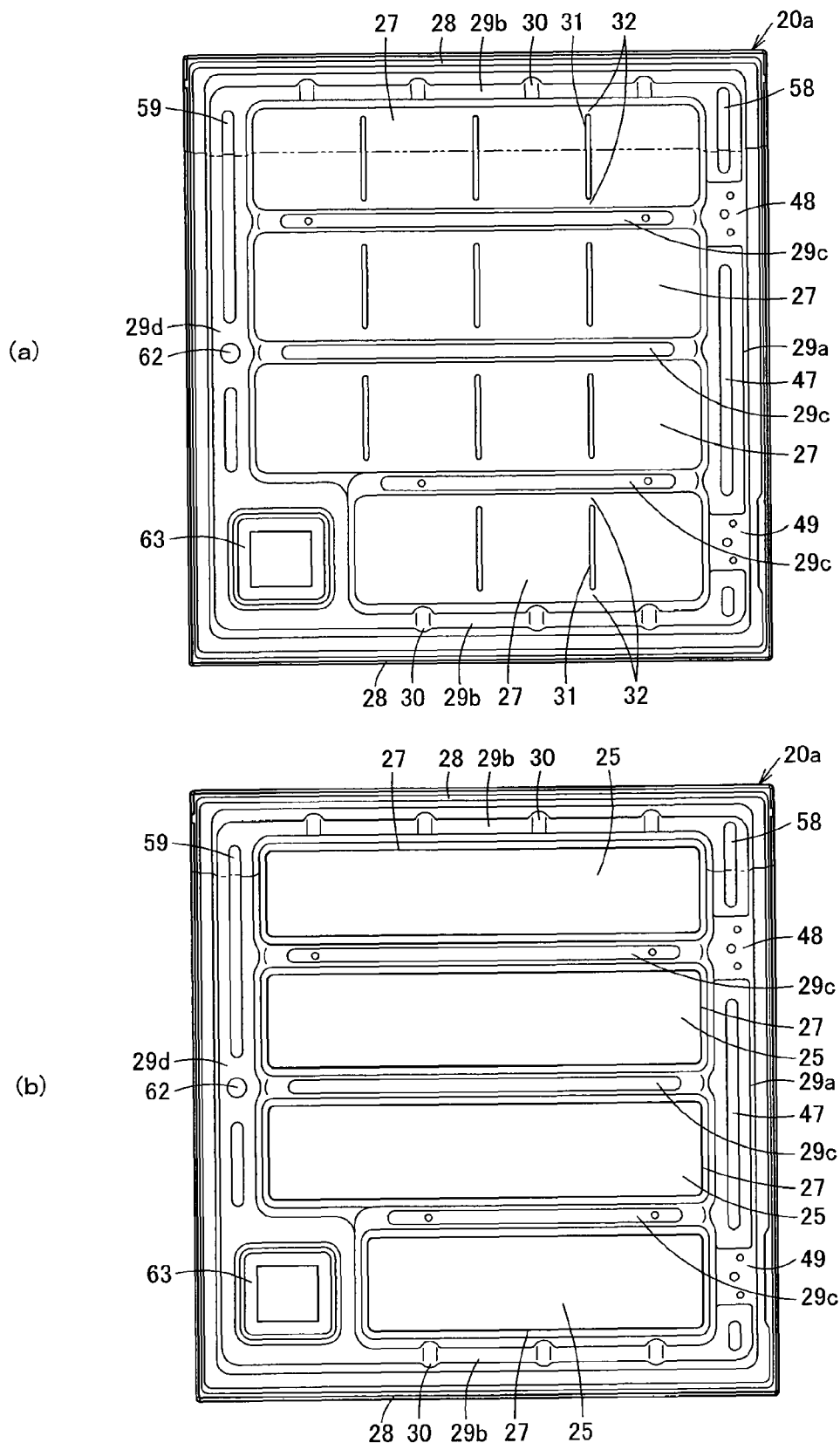
FIG. 10 is an internal view of a door panel according to a further example of the present invention, wherein (a) illustrates the state of the door panel prior to the cutting out of the ventilation openings, and (b) illustrates the state of the door panel after the cutting out of the ventilation openings.
Figure 11:
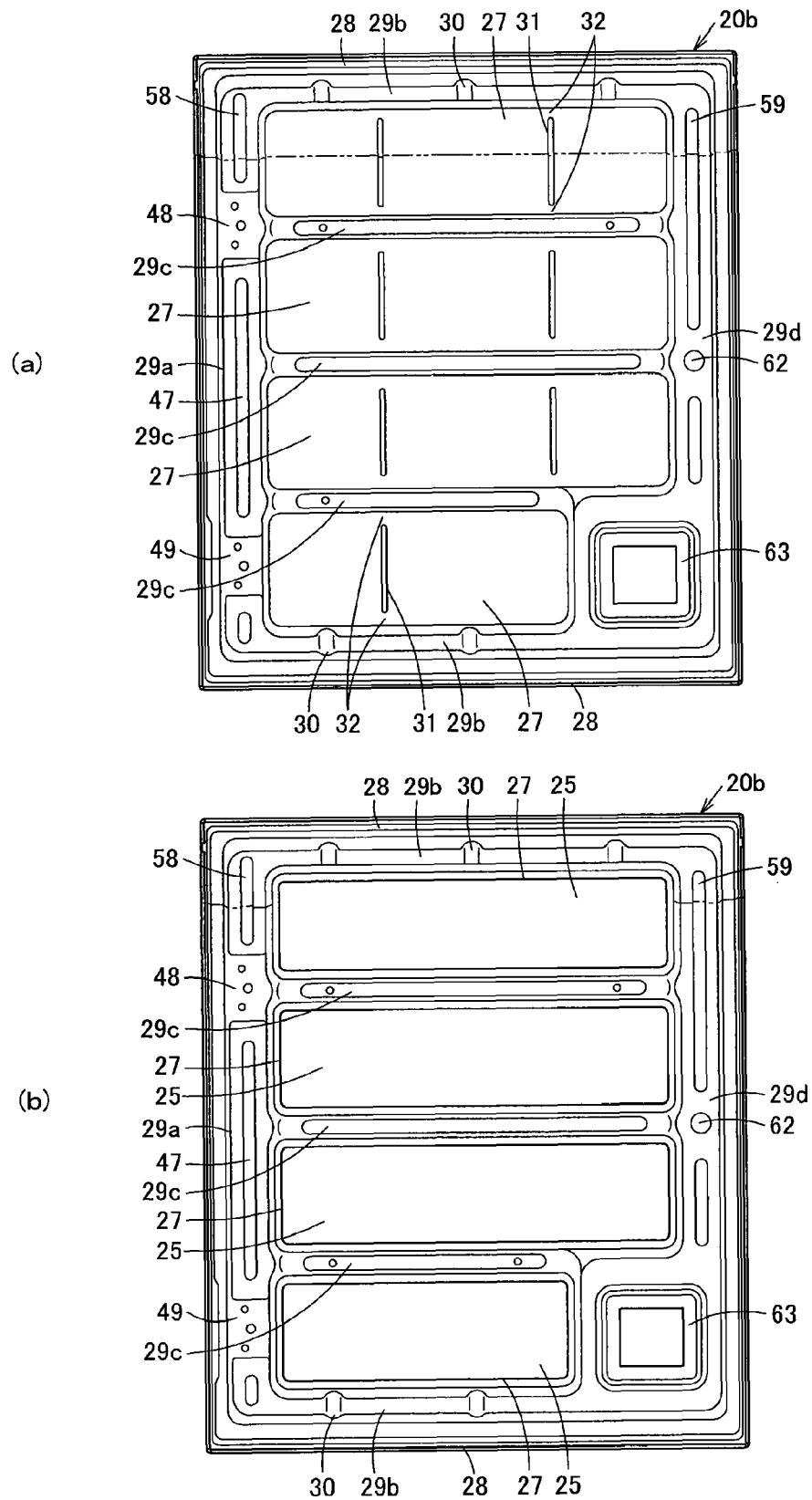
FIG. 11 is an internal view of a door panel according to yet another example of the present invention, wherein (a) illustrates the state of the door panel prior to the cutting out of the ventilation openings, and (b) illustrates the state of the door panel after the cutting out of the ventilation openings.
Figure 12:
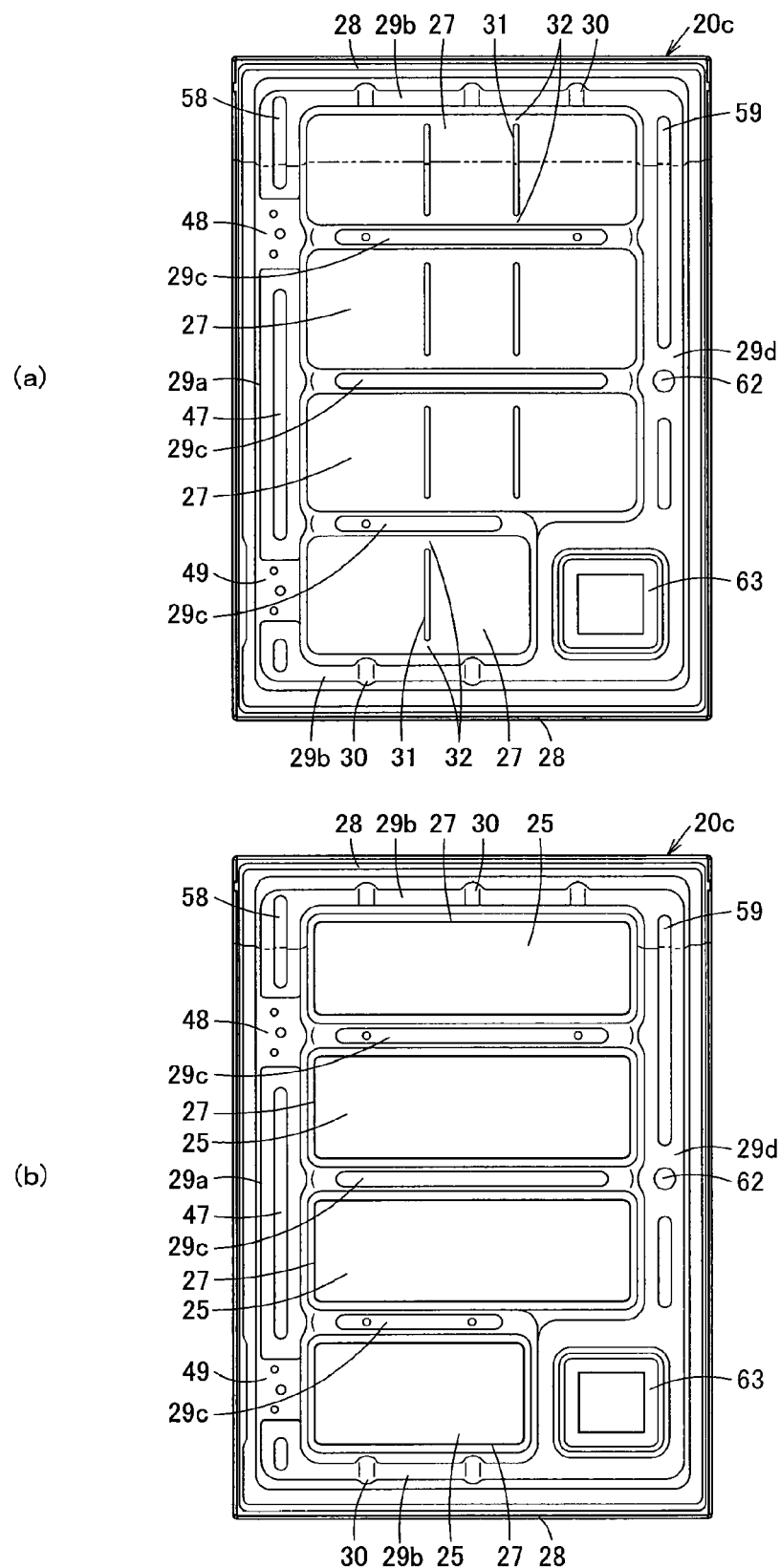
FIG. 12 is an internal view of a door panel according to an example of the present invention, wherein (a) illustrates the state of the door panel prior to the cutting out of the ventilation openings, and (b) illustrates the state of the door panel after the cutting out of the ventilation openings.
Figure 13:
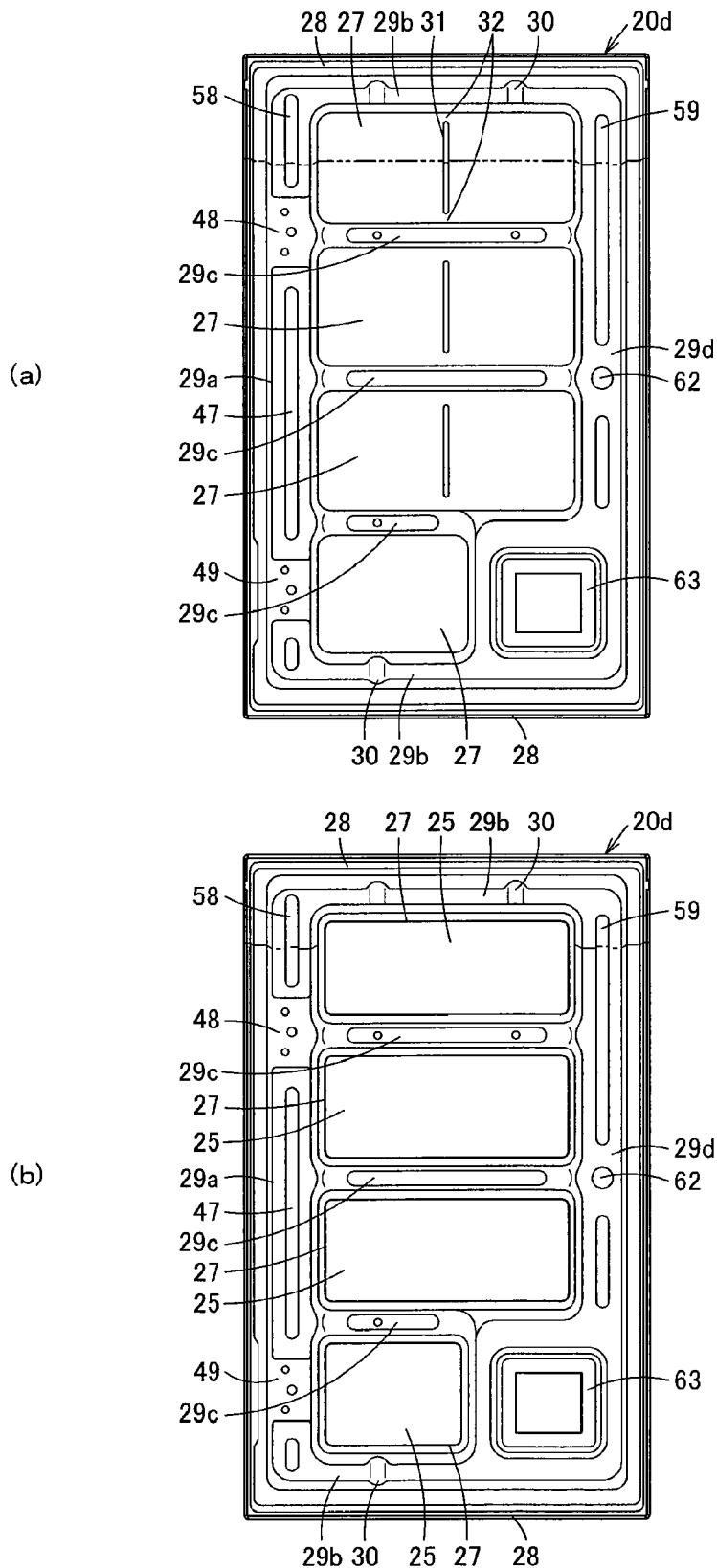
FIG. 13 is an internal view of a door panel according to a further example of the present invention, wherein (a) illustrates the state of the door panel prior to the cutting out of the ventilation openings, and (b) illustrates the state of the door panel after the cutting out of the ventilation openings.
Figure 14:
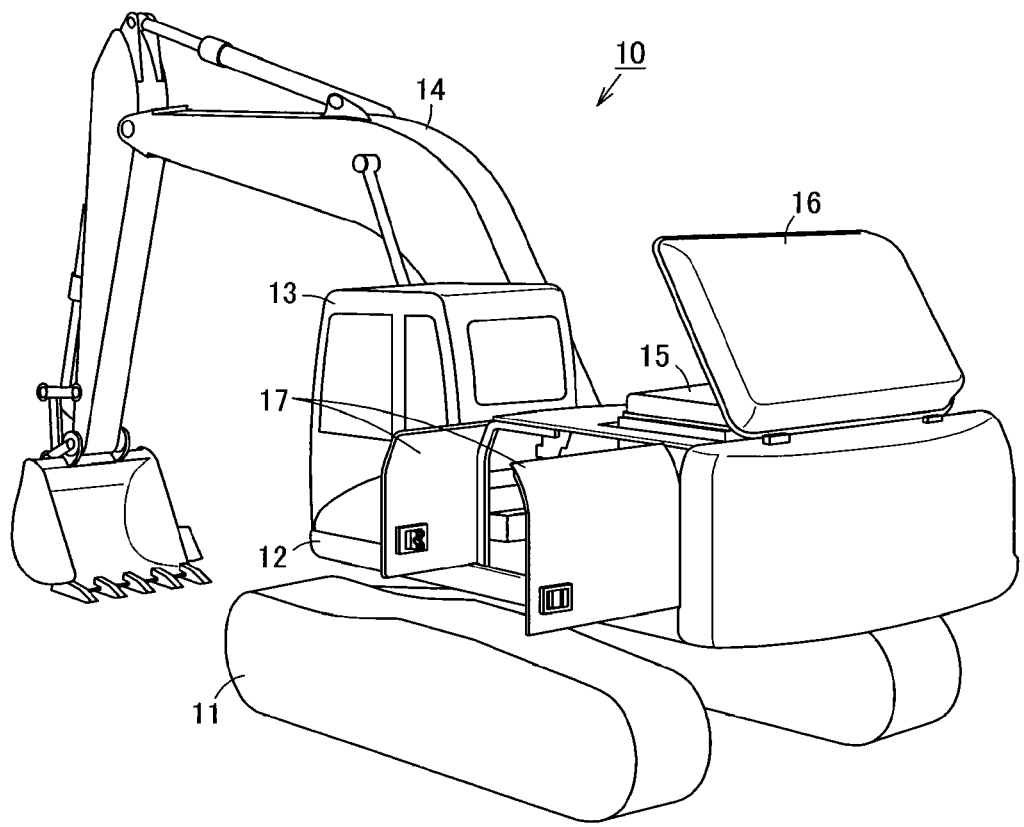
FIG. 14 is a perspective view of a work machine, to which a conventional door panel is attached.
Figure 15:
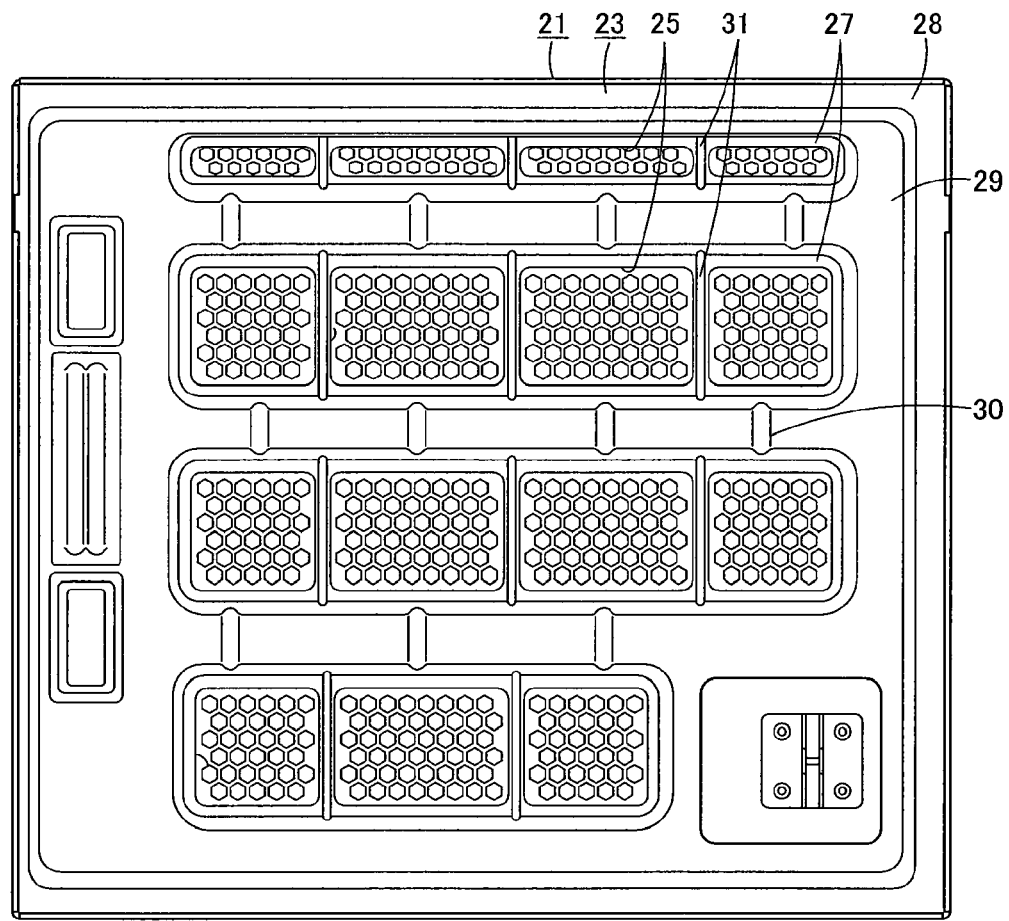
FIG. 15 is an internal view of a door panel that has already been proposed.

Next, the present invention is explained in detail hereunder, referring to an example thereof illustrated in FIGS. 1 to 8, another example thereof illustrated in FIG. 9, a further example thereof illustrated in FIG. 10, yet another example thereof illustrated in FIG. 11, an example thereof illustrated in FIG. 12, and a further example thereof illustrated in FIG. 13.

An example is illustrated in FIGS. 1 to 8.

FIG. 7 illustrates a hydraulic excavator 10, which is a work machine. The hydraulic excavator 10 includes a lower structure 11, an upper structure 12, a cab 13, a work equipment 14, and a power system 15 that includes an engine. The cab 13, the work equipment 14, and the power system 15 are mounted on the upper structure 12, which is rotatably mounted on the lower structure 11. The power system 15 is covered by a top cover 16, side doors 17, and other such components.

FIG. 8 illustrates a side door 17 provided at the radiator room. The side door 17 is attached to a frame provided at the machine body. The side door 17 is attached to a hinge-attaching end 18, i.e. one of the lateral ends of the frame, by hinges 54, which will be explained later, so as to be capable of opening and closing. A striker 19s is attached to the opposite lateral end of the frame. The side door 17 is also provided with a latching device 19r, which can be engaged with and disengaged from the striker 19s, so that the side door 17 is maintained in the closed state by means of the latching device 19r.

FIGS. 1 to 5 illustrate a door panel 20 of the side door 17. The door panel 20 includes an outer panel 21, an inner panel 23, and a foamed material 24. The inner panel 23 is formed by means of press molding so as to have an uneven surface with recessed portions and raised portions. The recessed portions are fixed to the inner surface of the outer panel 21, and a space 22 is formed between the raised portions and the outer panel 21 and filled with the aforementioned foamed material 24.

The door panel 20 has ventilation openings 25, which comprise four ventilation openings 25a arranged one above another and formed in the outer panel 21 as illustrated in FIG. 2(b), and four ventilation openings 25b arranged one above another and formed in the inner panel 23 as illustrated in FIG. 1(b).

The outer panel 21 has a thickness ranging from 1.2 to 5.0 times that of the inner panel 23. In other words, an iron plate that is thinner than the outer panel 21 is used to form the inner panel 23. For example, if the outer panel 21 is an iron plate with a thickness of 1.2 mm, it is desirable to use a thin iron plate with a thickness of, for example, 0.6 or 0.8 mm to form the inner panel 23 in order to obtain sufficient strength and workability, which are reciprocal properties.

The foamed material 24 is formed by heating an unactivated foaming sheet of a foaming material, which is attached to the inner surface of the outer panel 21 or the inner surface of the inner panel 23, so that the heated foaming material is activated and expands inside the space 22 between the outer panel 21 and the inner panel 23. A highly expandable foaming rubber-base sound absorbing material that has an approximately 20-fold volumetric thermal expansion coefficient may desirably be used as the foaming material. It is desirable to conduct the heating of the foaming material during the baking finish process using a baking finish heating furnace.

Figure 1:
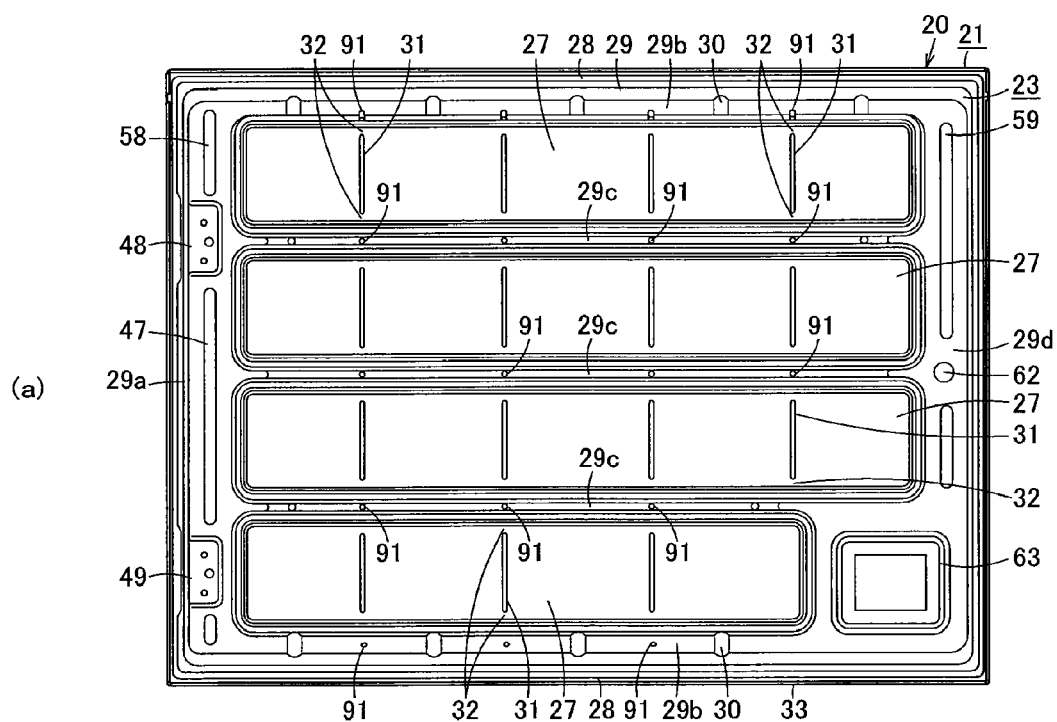
FIG. 1 is an internal view of a door panel according to an example of the present invention, wherein (a) illustrates the state of the door panel prior to the cutting out of ventilation openings, and (b) illustrates the state of the door panel after the cutting out of the ventilation openings.
Figure 1:
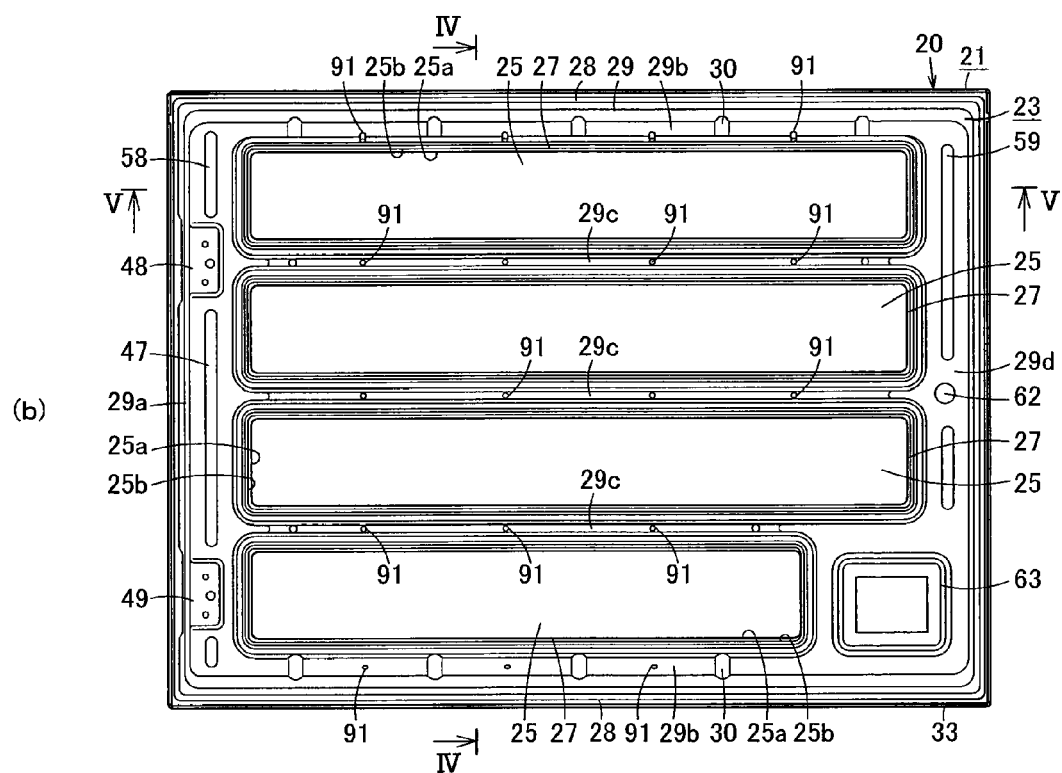
Figure 2:
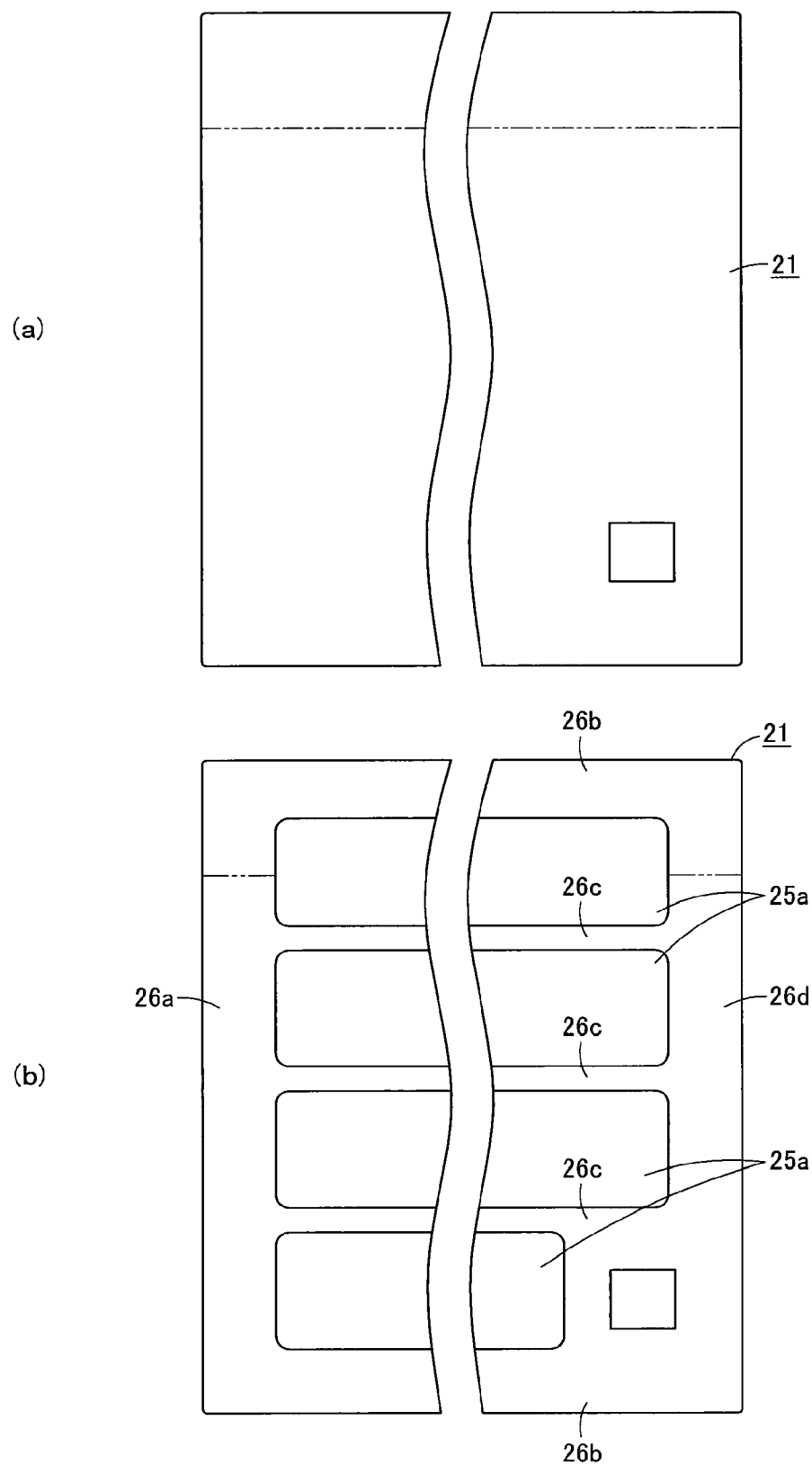
FIG. 2 is a front view of an outer panel of the door panel, wherein (a) illustrates the state of the door panel prior to the cutting out of the ventilation openings, and (b) illustrates the state of the door panel after the cutting out of the ventilation openings.
Figure 4:
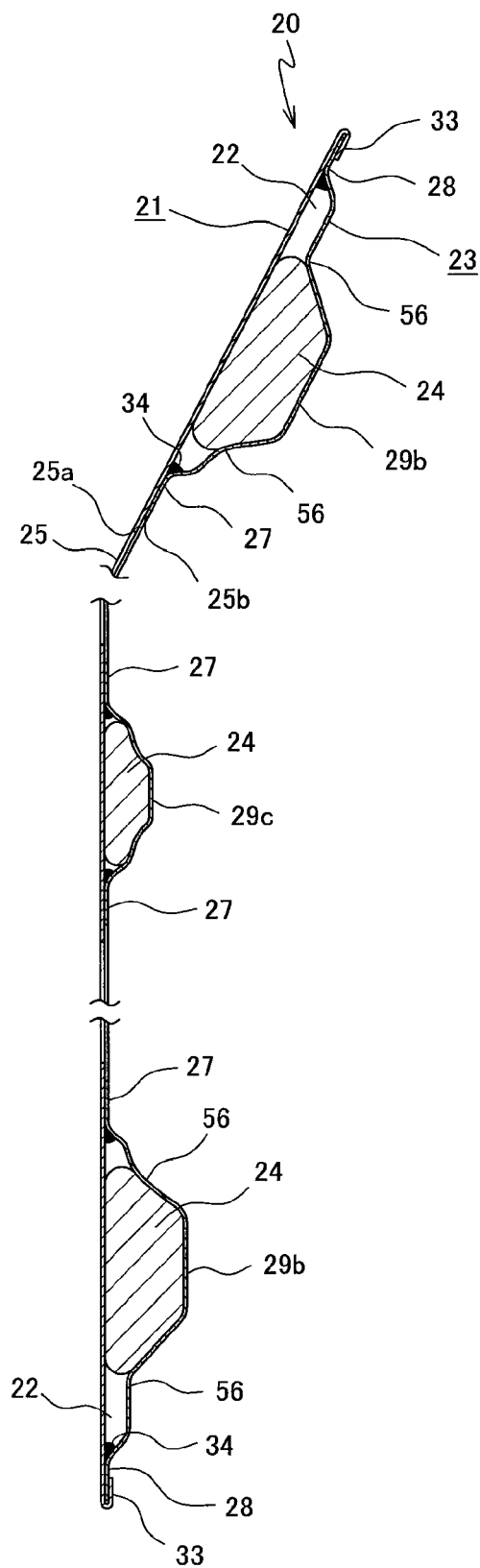
FIG. 4 is a sectional view taken along the line IV-IV of FIG. 1(b).
Figure 5:
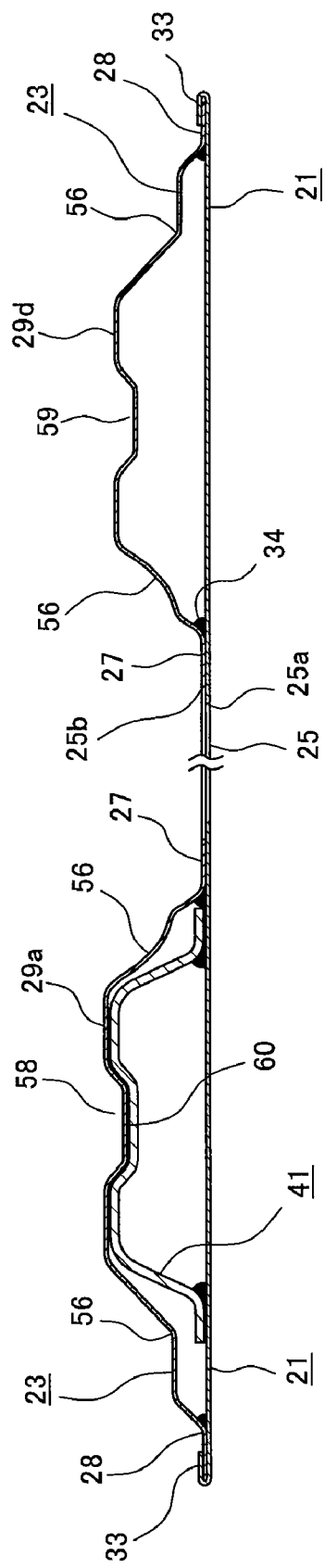
FIG. 5 is a sectional view taken along the line V-V of FIG. 1(b).

FIG. 2(a) illustrates the outer panel 21 prior to the formation of the ventilation openings 25a, whereas FIG. 2(b) illustrates the outer panel 21 after the formation of the ventilation openings 25a. As illustrated in FIG. 2(b), the outer panel 21 includes a panel portion 26a located at the hinge-attaching end, laterally extending panel portion 26b, which are respectively located at the top and the bottom of the outer panel 21, laterally extending panel portions 26c, which are respectively the second, third, and fourth panel portions from the top, and a panel portion 26d located at the latch-attaching end, and the ventilation openings 25a open between these panel portions 26a,26b,26c,26d. As illustrated in FIGS. 1, 4 and 5, the inner panel 23 has adhering portions 27,28, which are the aforementioned recessed portions joined to the inner surface of the outer panel 21, and a raised portion 29 bulging from the adhering portions 27,28. The adhering portions 27 surround the ventilation openings 25. The adhering portion 28 extends along the peripheral edge of the inner panel 23.

The raised portion 29 of the inner panel 23 comprises a vertically extending reinforcing plate housing raised portion 29a, laterally extending reinforcing raised portions 29b, crossbar-shaped reinforcing raised portions 29c, and a vertically extending reinforcing raised portion 29d. The reinforcing plate housing raised portion 29a has a large cross section and is formed at the hinge-attaching end of the inner panel 23. Of the laterally extending reinforcing raised portions, the reinforcing raised portions 29b have a large cross section and are respectively located at the top and the bottom, whereas crossbar-shaped reinforcing raised portions 29c are respectively the second, third, and fourth laterally extending reinforcing raised portions from the top and have a smaller cross section. The reinforcing raised portion 29d has a large cross section and is formed at the latch-attaching end of the inner panel 23.

The reinforcing plate housing raised portion 29a at the hinge-attaching end, the laterally extending reinforcing raised portions 29b at the top and, the bottom, and the reinforcing raised portion 29d at the latch-attaching end together constitute a frame-like reinforcing raised portion 29a,29b,29d, which is formed by bulging the peripheral portion of the inner panel 23 in a direction away from the outer' panel 21. The three crossbar-shaped reinforcing raised portions 29c are formed integrally with and surrounded by this frame-like reinforcing raised portion 29a,29b,29d, in other words within a boundary defined by the frame-like reinforcing raised portion 29a,29b,29d.

Each reinforcing raised portion 29b, which has a large cross section and serves as the top or the bottom reinforcing raised portion, is provided with reinforcing indentations 30 that are formed vertically across the reinforcing raised portion 29b. In order to ensure a sufficient aperture area for the ventilation openings 25, each reinforcing raised portion 29c with a smaller cross section is formed narrower as well as lower than each reinforcing raised portion 29b and, unlike the reinforcing raised portions 29b, not provided with a reinforcing indentation 30. In other words, as illustrated in FIG. 4, the frame-like reinforcing raised portion 29a,29b,29d of the inner panel 23 has a cross section larger than that of each crossbar-shaped reinforcing raised portion 29c.

FIG. 1(a) illustrates the inner panel 23 prior to the formation of the ventilation openings 25b. The flat adhering portions 27 of the inner panel 23 joined to the inner surface of the outer panel 21 are surrounded by the frame-like reinforcing raised portion 29a,29b,29d and the crossbar-shaped reinforcing raised portions 29c. Vertically extending rib portions 31 are formed within these adhering portions 27.

Figure 6:
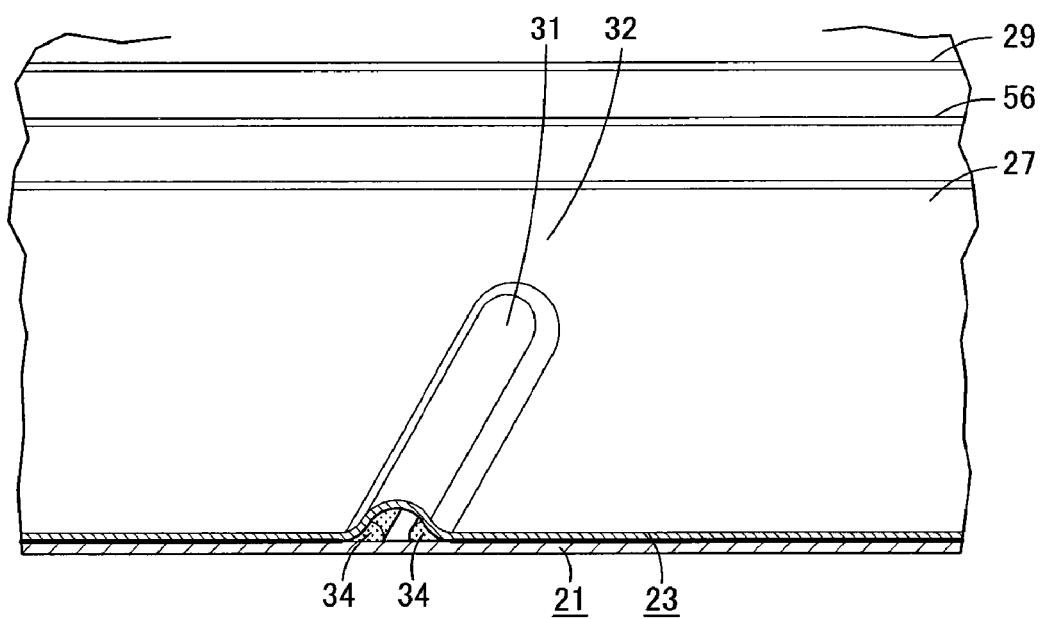
FIG. 6 is a perspective view of an opening cutout portion of the door panel.

Each adhering portion 27 includes an opening cutout portion 32, which is a portion to be cut out to form a ventilation opening 25b. As illustrated in FIG. 6, each opening cutout portion 32 includes portions that extend uninterruptedly at locations respectively adjacent to the upper and lower ends of the rib portions 31 of each respective adhering portion 27. The ventilation openings 25b can be formed as illustrated in FIG. 1(b) by cutting the adhering portions 27 along the peripheries of these opening cutout portions 32.

Most of the adhering portions 27 is cut out along the inner periphery of the frame-like reinforcing raised portion 29a, 29b,29d and the crossbar-shaped reinforcing raised portions 29c, in other words along cut-off lines that extend around the respective opening cutout portions 32, thereby forming the ventilation openings 25b.

As illustrated in FIGS. 4 and 5, the adhering portions 27 of the inner panel 23 are provided with the ventilation openings 25b, which are formed at locations respectively corresponding to the ventilation openings 25a of the outer panel 21. Each ventilation opening 25b is slightly larger than the corresponding ventilation opening 25a of the outer panel 21.

The outer peripheral edge of the outer panel 21 is provided with a hemmed portion 33 that is formed by folding the outer peripheral edge of the outer panel 21 so as to curl over the peripheral edge of the inner panel 23 and then pressing down the folded part substantially flat so that the outer peripheral edge of the outer panel 21 interlockingly secures the peripheral edge of the inner panel 23. The frame-like reinforcing raised portion 29a,29b,29d of the inner panel 23 is formed so as to rise from the hemmed portion 33 of the outer panel 21.

The adhering portions 27,28 of the inner panel 23 are bonded to the outer panel 21 with an adhesive 34, which joins as well as seals the outer panel 21 and the adhering portions 27,28 of the inner panel 23 together. The adhesive 34 may desirably be a paste-type structural adhesive having both viscous and thermosetting properties.

As illustrated in FIG. 5, an internal reinforcing plate 41 for mounting hinges is immovably sandwiched between the outer panel 21 and the reinforcing plate housing raised portion 29a of the inner panel 23 in the state where the inner panel 23 is positioned on and affixed to the inner surface of the outer panel 21.

As illustrated in FIG. 1, the reinforcing plate housing raised portion 29a of the inner panel 23 is provided with hinge mounting surface portions 48,49, on which hinges 54 are mounted as illustrated in FIG. 8. Each hinge 54 has a plate P1 and another plate P2. The plate P1 is adapted to be fixed onto the hinge mounting surface portion 48 or 49 of the inner panel 23, and the plate P2 is pivotally connected to the plate P1 through a shaft member and attached to the hinge-attaching end 18 of the frame provided at the machine body.

As illustrated in FIGS. 1, 4, and 5, the inner panel 23 includes the frame-like reinforcing raised portion 29a, 29b, 29d with a large cross section. The frame-like reinforcing raised portion 29a,29b,29d is formed along so as to bulge from the adhering portions 27,28, which are in direct contact with the outer panel 21. A reinforcing deformed portion 56 is formed in a step-like shape along the middle of each sloping side of the frame-like reinforcing raised portion 29a,29b,29d, enabling the frame-like reinforcing raised portion 29a,29b, 29d to have a sufficient height with respect to the outer panel 21 as well as sufficient strength.

To be more specific, the frame-like reinforcing raised portion 29a,29b,29d, which has a relatively large cross section, is excellent in cross-sectional characteristics, such as the geometric moment of inertia. Furthermore, in addition to the effect of the reinforcing structure achieved by the reinforcing deformed portions 56 and the reinforcing indentations 30, etc., the frame-like reinforcing raised portion 29a,29b,29d is resistant to bending stress and other similar external force and not easily deformed.

On the other hand, relatively speaking, the cross section of each reinforcing raised portion 29c is smaller as well as narrower than that of the frame-like reinforcing raised portion 29a,29b,29d, thereby enabling the ventilation openings 25 to have a large aperture area.

Figure 3:
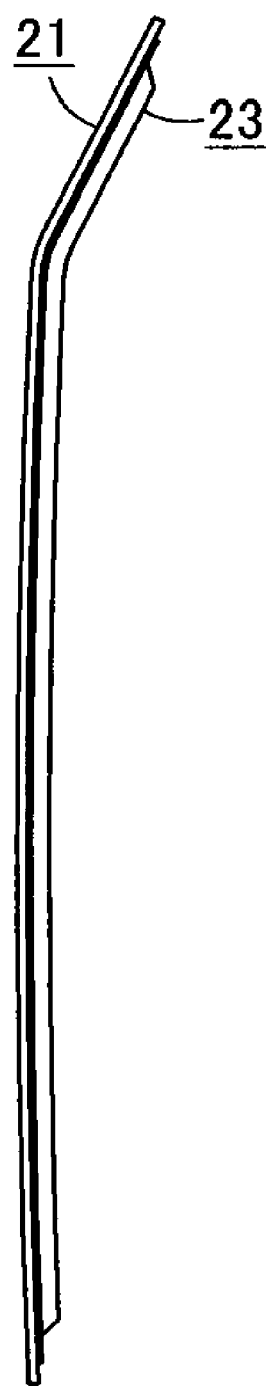
FIG. 3 is a side view of the door panel.

The reinforcing plate housing raised portion 29a and the reinforcing raised portion 29d, which are respectively located at one lateral end and the other lateral end of the crossbar-shaped reinforcing raised portions 29c, are bent inward so that the reinforcing raised portion 29b that is at the top is angled inward as illustrated in FIGS. 3, 4, and 8.

To be more specific, the upper part of the door panel 20 is bent towards the machine body more than is the lower part of the door panel 20, which extends almost vertically. When the upper part of the door panel 20 is bent, wrinkles are prone to forming on the upper part of the reinforcing plate housing raised portion 29a and the reinforcing raised portion 29d, which are respectively located at the hinge-attaching end and the latch-attaching end of the inner panel 23.

Therefore, as illustrated in FIGS. 1 and 5, in order to prevent formation of wrinkles, wrinkle preventing indentations 58,59 are respectively formed in the inner surfaces of the reinforcing plate housing raised portion 29a and the reinforcing raised portion 29d, which are adapted to be bent and are respectively located at the hinge-attaching end and at the latch-attaching end of the inner panel 23.

As illustrated in FIG. 5, the internal reinforcing plate 41, too, is provided with an indentation 60, in which one of the wrinkle preventing indentations of the inner panel 23, i.e. the wrinkle preventing indentation 58, is adapted to be fitted in order to prevent interference with the wrinkle preventing indentation 58.

As illustrated in FIG. 4, the interior of the laterally extending reinforcing raised portions 29b and the crossbar-shaped reinforcing raised portions 29c is filled with the foamed material 24. On the other hand, as illustrated in FIG. 5, the interior of the vertically extending reinforcing raised portions, i.e. the reinforcing plate housing raised portion 29a at the hinge-attaching end and the reinforcing raised portion 29d at the latch-attaching end, is not filled with the foamed material. As a result, it is possible to reduce the quantity of the foaming material as well as labor time, such as the time required for attaching the foaming material, while maintaining sufficient vibration damping effect of the formed material 24.

As illustrated in FIG. 1, a vibration suppressing indentation 62 and a latch mounting hole 63 are formed below the other wrinkle preventing indentation of the inner panel 23, i.e. the wrinkle preventing indentation 59. The vibration suppressing indentation 62 is utilized to suppress vibration of the door panel 20. As illustrated in FIG. 8, the frame provided at the machine body includes a vibration suppressing protrusion 65, which is formed at the end where the striker 19s for engaging with the latching device 19r is provided. The vibration suppressing protrusion 65 is adapted to fit in the vibration suppressing indentation 62 so as to prevent vertical vibration of the door panel 20, when the door panel 20 is in the closed state.

Next, a production process of the door panel 20 is explained.

The ventilation openings 25a are formed in the outer panel 21, and the ventilation openings 25b are formed in the inner panel 23. In the state where the outer panel 21, the inner panel 23, and the internal reinforcing plate 41 are fastened to one another by the hemmed portion 33, which is provided along the peripheral edge of the outer panel 21, and a fixing jig (not shown), the inner panel 23, the internal reinforcing plate 41, and the outer panel 21 are placed in a baking finish heating furnace in order to bond the inner panel 23, the internal reinforcing plate 41, and the outer panel 21 to one another by hardening the thermosetting adhesive applied to the surfaces between these three components.

At that time, the foaming material attached to the inner surface of the outer panel 21 or the inner surface of the inner panel 23 is expanded by heating using the baking finish heating furnace so that the space 22 is filled with the foamed material 24. By further heating using the baking finish heating furnace, the paint that has been sprayed beforehand onto the outer surface of the outer and inner panels 21,23 is baked thereon.

For example, thermal hardening of the adhesive 34 is conducted by heating for 5 minutes at 150° C.; formation of the foamed material 24 by expansion by heating for 20 minutes at 150° C.; and baking finish by heating for 20 minutes at 180° C.~200° C. Such heating can be performed by using a conventional baking finish heating furnace.

Finally, as illustrated in FIG. 8, the hinges 54 are mounted on the door panel 20, thereby attaching the door panel 20 to the hinge-attaching end 18 of the frame provided at the machine body.

Next, the functions and effects of the example illustrated in FIGS. 1 to 8 are explained hereunder.

With regard to the door panel 20 in which the ventilation openings 25 are formed, the hollow structure with a closed cross section formed of the outer panel 21 and the inner panel 23, which is thinner than the outer panel 21, can make the entire door panel 20 lighter. Furthermore, as the closed cross section of this hollow structure has sufficient height, being formed of the inner panel 23 and the outer panel 21 with a thickness greater than that of the inner panel 23, i.e. 1.2 to 5.0 times thicker than the inner panel 23, the door panel has sufficient strength against an external impact. Therefore, the example is capable of inexpensively providing a door panel that is light in weight and has sufficient strength.

Furthermore, the foamed material 24 filling the space between the outer panel 21 and the inner panel 23 is capable of absorbing sound and thereby effectively damping sound generated from the door panel itself and, consequently, provides high damping effect to reduce noise.

The vertically extending rib portions 31 are formed within the flat adhering portions 27, which are surrounded by the frame-like reinforcing raised portion 29a,29b,29d and the crossbar-shaped reinforcing raised portions 29c of the inner panel 23 and joined to the outer panel 21. Each adhering portion 27 includes an opening cutout portion 32, which can be cut out for formation of a ventilation opening 25b and includes portions that extend uninterruptedly at locations respectively adjacent to the upper and lower ends of the rib portions 31 of the adhering portion 27. The rib portions 31 prevent deformation and improve the rigidity of the adhering portions 27. Furthermore, it is possible to form a large ventilation opening 25b in each adhering portion 27 without significantly impairing the shape or the strength of the door panel 20 by cutting out the ventilation opening 25b from the adhering portion 27, together with the rib portions 31, along the periphery of the opening cutout portion 32, which extends uninterruptedly without intersecting the rib portions 31. The door panel 20 according to the invention can thus be easily modified to withstand severe heat. Furthermore, a clean-cut surface is ensured, because the door panel according to the invention is free from the problem of holes or the like, such as the one shown in FIG. 16, forming the cut surfaces of the adhering portions 27.

The frame-like reinforcing raised portion 29a,29b,29d, which has a relatively large cross section, is excellent in cross-sectional characteristics, such as the geometric moment of inertia, and not easily deformed by bending stress or other similar external force. Therefore, even if the ventilation openings 25 are cut out of the door panel 20, the frame-like reinforcing raised portion 29a,29b,29d ensures sufficient strength, while the crossbar-shaped reinforcing raised portions 29c, which have a relatively small cross section, ensure the ventilation openings 25 are formed with a great aperture area.

The frame-like reinforcing raised portion 29a,29b,29d of the inner panel 23 is formed so as to rise from the hemmed portion 33 of the outer panel 21, which is formed by folding the peripheral edge of the outer panel 21. Therefore, the rigidity of the door panel is increased by the hemmed portion 33 and the frame-like reinforcing raised portion 29a,29b,29d adjacent thereto. Furthermore, as the distance from the frame-like reinforcing raised portion 29a,29b,29d to the peripheral edge of the panel is reduced, the ventilation openings 25 are ensured of having a correspondingly great aperture area.

Next, FIG. 9 illustrates another example of the present invention. Accordingly, a dust prevention screen 71, such as a debris screen, is attached to the inner surface of the door panel 20 from which the ventilation openings 25 have been cut out. The outside air is sucked into the radiator room through numerous small holes (not shown) formed in the dust prevention screen 71, while dust and dirt in the air are blocked. The dust prevention screen 71 is fastened to the inner panel 23 by means of stud bolts 91 as well as nuts screwed around the stud bolts 91. As illustrated in FIG. 1, the stud bolts 91 are projected from the reinforcing raised portions 29b, which are respectively the top and bottom reinforcing raised portions, and also from the crossbar-shaped reinforcing raised portions 29c.

Next, FIG. 10 illustrates a further example of the present invention. The door panel 20a illustrated in FIG. 10(*a*) includes the outer panel 21 and the inner panel 23. The flat adhering portions 27 of the inner panel 23 joined to the inner surface of the outer panel 21 are surrounded by the frame-like reinforcing raised portion 29a, 29b, 29d and the crossbar-shaped reinforcing raised portions 29c. Vertically extending rib portions 31 are formed within these adhering portions 27. Each adhering portion 27 includes an opening cutout portion 32, which can be cut out for formation of a ventilation opening 25 as illustrated in FIG. 10(*b*) and includes portions that extend uninterruptedly at locations respectively adjacent to the upper and lower ends of the rib portions 31 of the adhering portion 27.

Next, FIG. 11 illustrates yet another example of the present invention. The door panel 20b illustrated in FIG. 11(*a*) includes the outer panel 21 and the inner panel 23. The flat adhering portions 27 of the inner panel 23 joined to the inner surface of the outer panel 21 are surrounded by the frame-like reinforcing raised portion 29a, 29b, 29d and the crossbar-shaped reinforcing raised portions 29c. Vertically extending rib portions 31 are formed within these adhering portions 27. Each adhering portion 27 includes an opening cutout portion 32, which can be cut out for formation of a ventilation opening 25 as illustrated in FIG. 11(*b*) and includes portions that extend uninterruptedly at locations respectively adjacent to the upper and lower ends of the rib portions 31 of the adhering portion 27.

Next, FIG. 12 illustrates an example of the present invention. The door panel 20c illustrated in FIG. 12(*a*) includes the outer panel 21 and the inner panel 23. The flat adhering portions 27 of the inner panel 23 joined to the inner surface of the outer panel 21 are surrounded by the frame-like reinforcing raised portion 29a,29b,29d and the crossbar-shaped reinforcing raised portions 29c. Vertically extending rib portions 31 are formed within these adhering portions 27. Each adhering portion 27 includes an opening cutout portion 32, which can be cut out for formation of a ventilation opening 25 as illustrated in FIG. 12(*b*) and includes portions that extend uninterruptedly at locations respectively adjacent to the upper and lower ends of the rib portions 31 of the adhering portion 27.

Next, FIG. 13 illustrates a further example of the present invention. The door panel 20d illustrated in FIG. 13(*a*) includes the outer panel 21 and the inner panel 23. The flat adhering portions 27 of the inner panel 23 joined to the inner surface of the outer panel 21 are surrounded by the frame-like reinforcing raised portion 29a,29b,29d and the crossbar-shaped reinforcing raised portions 29c. Vertically extending rib portions 31 are formed within these adhering portions 27. Each adhering portion 27 includes an opening cutout portion 32, which can be cut out for formation of a ventilation opening 25 as illustrated in FIG. 13(*b*) and includes portions that extend uninterruptedly at locations respectively adjacent to the upper and lower ends of the rib portions 31 of the adhering portion 27.

As described above, an opening cutout portion 32 that can be cut out is provided in each adhering portion 27 so as to include portions respectively above the upper end and below the lower end of the vertically extending rib portions 31 formed on the adhering portion 27, in other words, portions that extend between the upper or lower ends of the rib portions 31 and the frame-like reinforcing raised portion 29a,29b,29d or the corresponding crossbar-shaped reinforcing raised portion 29c.

Figure 16:
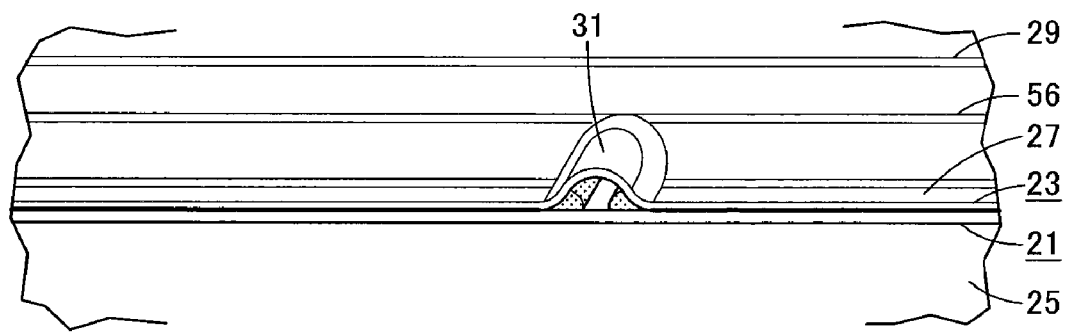
FIG. 16 is a perspective view of the door panel of FIG. 15, illustrating the state where a part of the door panel has been cut out.

Therefore, if the ventilation openings 25b are cut out from the inner panel 23, the state where the outer panel 21 and the inner panel 23 are bonded to each other is maintained also along the portion adjacent to each portion that has been cut out, without the possibility of holes, such as the one shown in FIG. 16, forming due to the rib portions 31.

Furthermore, limiting the height of the crossbar-shaped reinforcing raised portions 29c to, for example, approximately 15 mm enables the frame-like reinforcing raised portion 29a,29b,29d to have a height of approximately 25 mm, thereby greatly increasing the geometric moment of inertia of the frame-like reinforcing raised portion 29a,29b,29d.

The present invention provides a door panel that is applicable to a side door or the like of a radiator room, a battery room, a pump room, or the like of a work machine, such as a hydraulic excavator, a loader, or a bulldozer.

The invention claimed is:
1. A door panel comprising:
an outer panel; and
an inner panel affixed to the inner surface of the outer panel, wherein the inner panel comprises:
  a frame-like reinforcing raised portion in which the peripheral portion of the inner panel is bulged away from the outer panel;
  a plurality of laterally extending crossbar-shaped reinforcing raised portions provided within a boundary defined by the frame-like reinforcing raised portion and formed as an integral body with the frame-like reinforcing raised portion;

flat adhering portions surrounded by the frame-like reinforcing raised portion and the crossbar-shaped reinforcing raised portions and joined to the outer panel;

vertically extending rib portions provided within the adhering portions; and opening cutout portions, each of which is adapted to be cut out to form a ventilation opening in each respective adhering portion and includes portions that extend uninterruptedly at locations respectively adjacent to the upper and lower ends of the rib portions of the adhering portion, wherein the plurality of rib portions are provided within the adhering portions in a direction perpendicular to a longitudinal direction of the opening cutout portions and stop before reaching the frame-like reinforcing raised portion and the crossbar-shaped reinforcing raised portions.

2. A door panel as claimed in claim 1, wherein:
the frame-like reinforcing raised portion of the inner panel has a cross section larger than that of each crossbar-shaped reinforcing raised portion.

3. A door panel as claimed in claim 1, wherein:
the door panel includes a hemmed portion in which the peripheral edge of the outer panel is folded so as to curl over the peripheral edge of the inner panel and then pressing down the folded part; and
the frame-like reinforcing raised portion of the inner panel is provided so as to rise from the hemmed portion of the outer panel.

4. A door panel as claimed in claim 2, wherein:
the door panel includes a hemmed portion in which the peripheral edge of the outer panel is folded so as to curl over the peripheral edge of the inner panel and then pressing down the folded part; and
the frame-like reinforcing raised portion of the inner panel is provided so as to rise from the hemmed portion of the outer panel.

* * * * *